Nov. 4, 1952 — P. J. CADE — 2,616,949
CONDUCTIVITY CELL TEST ELEMENT
Filed Feb. 2, 1951
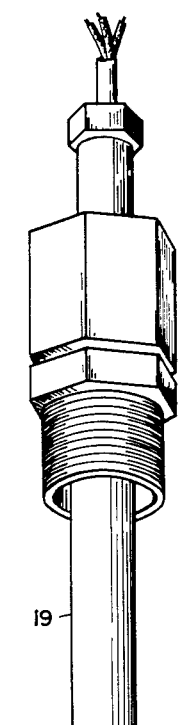
FIG. 1
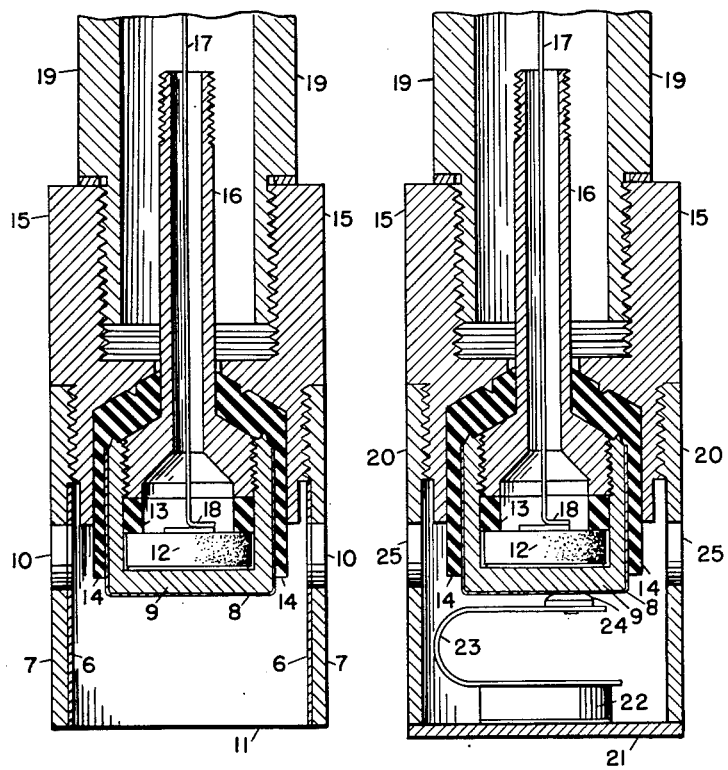
FIG. 3
FIG. 5
FIG. 4
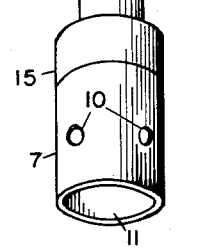
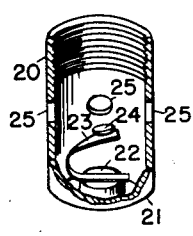
FIG. 2
INVENTOR
P. J. CADE
BY
O. F. Douvas
ATTORNEY Patented Nov. 4, 1952

2,616,949

UNITED STATES PATENT OFFICE 2,616,949

CONDUCTIVITY CELL TEST ELEMENT

Phillip J. Cade, Winchester, Mass., assignor to Photoswitch Marine Division, Inc., New York, N. Y., a corporation of New York Application February 2, 1951, Serial No. 209,156

7 Claims. (Cl. 175—183)

This invention relates to testing apparatus and, in particular, to a test-impedance element for checking the accuracy of liquid electrolyte indication and control apparatus which utilize automatic temperature - compensating conductivity cells.

It is customary to employ indication and control apparatus of this type aboard all large seagoing vessels which distill sea water for boiler feedwater, drinking, cooling and other water requirements. A temperature-compensating conductivity cell is usually mechanically coupled to the output of the distilling apparatus to determine the amount of sea salt therein and to produce control operations responsive only to sea salt concentration. The test-impedance element of this invention is designed to cooperate with particular automatic temperature-compensating conductivity cells of the prior art, whereby the operative accuracy of the conductivity cells may be supervised as well as the operative accuracy of the apparatus connected to the conductivity cells.

Temperature-compensating conductivity cells, when immersed in an electrolyte solution and connected to auxiliary apparatus, are capable of producing several different types of output functions which are responsive only to the electrolyte concentration of the solution under test. In certain arrangements this function may be the actuation of a meter, whereby quantitative indications of the electrolyte concentration may be had. In other arrangements the function may be the operation of particular apparatus, such as liquid-dumping apparatus, in response to excess electrolyte concentration in the liquid under test. In any event, inaccurate operation of the conductivity cell and its associated apparatus will detrimentally affect the results obtained therefrom.

Basically, a conductivity cell usually comprises two electrodes whose spacing and liquid contact area are accurately fixed. When this cell is immersed in an electrolyte solution the electrical impedance of the liquid volume between the electrodes can be determined. Since the impedance of salt water, for example, varies inversely to the concentration of the electrolyte, continual or periodic electrical conductivity testing of the portion of the liquid sampled by a set of these cell electrodes will disclose minute changes in the salinity of the liquid.

Unfortunately, the impedance of salt water is affected not only by the electrolyte concentration thereof, but also by the temperature of the liquid. Temperature - compensating conductivity cells have, therefore, been utilized in the prior art to compensate for inaccuracies in salinity measurements introduced by ambient temperature changes in the liquid under test. These cells usually comprise, in addition to the electrodes of the basic cell, a temperature-compensating impedance element having substantially the same negative temperature coefficient of impedance as the liquid under test. The complete temperature - compensating conductivity cell, therefore, comprises two impedance elements, the temperature - compensating impedance element and the liquid volume under test between the basic electrodes.

The impedance value of the temperature-compensating element for a conductivity cell is usually selected to have a resistance-temperature characteristic equal to that of a volume of liquid of specified composition and electrolyte concentration between the basic electrodes of the cell. This impedance value makes possible a translating of the output of the conductivity cell in terms of electrolyte concentration. The initial impedance value of the compensating element must, therefore, be maintained for the life of the cell for an accurate calibration of the responses therefrom.

If the impedance value of the temperature-compensating element varies in response to any physical factor other than temperature, the output of the cell cannot be translated to the acual electrolyte concentration of the liquid under test. Likewise, if the temperature coefficient of impedance of the compensating element changes, inaccurate cell operation will result. Other inaccuracies may be caused by variations in the value or defective operation of the components of the auxiliary apparatus connected to the conductivity cell.

All of these inaccuracies may be detected by the test element of this invention, as well as many others which will be obvious in the light of the detailed description which follows hereinafter.

The structure of this test element contemplates a circular disc-type solid resistor having a resistance-temperature characteristic equal to that of a volume of liquid of specified composition and electrolyte concentration between the electrodes of the conductivity cell to which the test element is to be coupled. One circular surface of the resistor is soldered to the flat bottom plate of a tubular shell. A flexible U-shaped spring having an electrical contact thereon is soldered to the other surface of the resistor. The inner surface of the tubular shell is threaded at the end opposite the bottom plate, so that the entire test element assembly may be mechanically coupled to a conductivity cell by unscrewing a removable outer electrode of the cell and utilizing the threads which formerly received the outer electrode to engage the threads of the test element. This engaging operation causes a compressing of the U-shaped spring whereby the contact thereon is firmly pressed against an inner electrode of the conductivity cell.

This affixing of the test element to the conductivity cell, after the test element resistor assumes the same temperature as the compensating impedance element, is equivalent to immersing the cell in a liquid of specified composition and electrolyte concentration. Consequently, by connecting the cell to a conventional metering circuit for giving quantitative indications of the electrolyte concentration, a concentration reading determined by the impedance value of the test element should be indicated. If this reading is not given and the metering circuit is operating properly, the conductivity cell is defective. Likewise, if the cell is connected to control apparatus which is to produce a response when the electrolyte concentration of the liquid under test reaches a certain value, the coupling of a test element simulating the required electrolyte concentration to the conductivity cell should cause the control apparatus to operate. If this operation does not occur and the conductivity cell is operating properly, the control apparatus is defective.

Heretofore, the aforementioned testing operations have been conducted by immersing the conductivity cell in a carefully prepared solution of the required electrolyte concentration, or, preferably, by connecting a fixed resistor or a rheostat with an undetermined temperature coefficient of resistance between the basic cell electrodes to simulate immersion of the cell in a liquid of the required composition and electrolyte concentration. However, to check the operative accuracy of a temperature-compensating conductivity cell and the auxiliary apparatus connected thereto, by utilizing the resistor or rheostat method, it was necessary to know the temperature of the cell before the proper value for the liquid-simulating resistor or rheostat could be determined. The apparatus of this invention makes such temperature measurements unnecessary, because the cell test resistor and the temperature-compensating impedance element attain the same ambient temperature in a short time and also have the same temperature coefficient of impedance.

Accordingly, it is an object of this invention to simplify and improve test apparatus for checking the operative accuracy of temperature-compensating conductivity cells and their auxiliary apparatus whereby the temperature of the tested cells need not be determined.

In order that the mode of operation of the novel structure of this invention may be readily understood, reference is herein made to the drawings, wherein:

Fig. 1 is a perspective view of a temperature-compensating conductivity cell to which the test element of this invention may be coupled;

Fig. 2 is a perspective view of the test element with portions thereof broken away;

Fig. 3 is a sectional view of the electrode portion of the conductivity cell of Fig. 1;

Fig. 4 is a sectional view of the test element of Fig. 2; and

Fig. 5 is a sectional view showing the test element of Figs. 2 and 4 coupled to the conductivity cell of Fig. 1.

A detailed description of the temperature-compensating conductivity cell shown in perspective in Fig. 1 may be found in the application of P. J. Cade and B. E. Shaw, Serial No. 209,158, filed February 2, 1951. The test element of this invention, shown in perspective with a portion thereof broken away in Fig. 2, is particularly adapted for use with this conductivity cell. It is to be understood, however, that with minor obvious modifications the test element may be adapted for use with many of the conventional temperature-compensating conductivity cells of the prior art.

Fig. 3 is a sectional view of the electrode portion of the conductivity cell of Fig. 1. When this portion of the cell is immersed in the liquid under test, the inner surface 6 of metallic electrode 7 and the outer surface 8 of metallic inner container electrode 9 are wetted by liquid flowing through side apertures 10 and end opening 11. The liquid volume between surfaces 6 and 8 comprises the impedance of the conductivity cell which the test element of Figs. 2 and 4 simulates.

The lower surface of temperature-compensating resistor 12 is soldered to the inner surface of electrode 9. Insulating spacer 13 assures the permanence of this soldered connection by mechanically supporting resistor 12. Resistor 12, for most efficient temperature compensation, should have the same temperature coefficient of impedance as the liquid under test. Insulating ring 14 prevents electrode 9 from making electrical contact with electrode 7 through metallic adapter piece 15, and inasmuch as spacer 13 is an insulator, the right surface of resistor 12 is prevented from making electrical contact with metallic electrode holder 16.

Electrically speaking, the temperature-compensating conductivity cell, therefore, comprises two impedance elements with one terminal of each element being commonly connected. That is, one surface of resistor 12 is connected electrically to container electrode 9 by the common soldered junction therebetween. An external electrical connection is made to this common junction by an electrical path which includes electrode holder 16.

Electrical connection is made to the top surface of resistor 12 by soldering a loop 18 of conductor 17 to the top surface of the resistor.

Electrical connection is made to electrode 7 by an electrical path which includes metallic cell tube 19 and metallic adapter piece 15.

Outer electrode 7 is removed from the rest of the cell assembly by unscrewing electrode 7 with respect to adapter piece 15. With electrode 7 removed, the cell assembly can receive the test element shown in Figs. 2 and 4.

This test element comprises a tubular shell 20 to which bottom plate 21 is soldered. The inside surface of the top portion of tubular shell 20 is threaded to receive the mating threads of adapter piece 15. One circular surface of disc-shaped resistor 22 is soldered to the top surface of bottom plate 21. U-shaped spring 23 is soldered to the top surface of resistor 22, and contact 24 is affixed to the free end of the U-shaped spring.

In Fig. 5, after removal of outer electrode 7, the test element of Fig. 4 is coupled to the conductivity cell by engaging the threads of the test element to the threads of adapter piece 15. With this operation, U-shaped spring 23 is compressed and contact 24 is firmly pressed against surface 8 of container electrode 9. Test resistor 22 is, therefore, bridged directly across container electrode 9 and adapter piece 15. Such an arrangement is equivalent to immersing the conductivity cell in a solution of known electrolyte concentration and composition, if resistor 22 has a temperature-resistance characteristic equal to that of a volume of said solution between electrodes 6 and 8.

If the conductivity cell-test element assembly is connected to indicating and control apparatus of the type disclosed in the copending application of P. J. Cade and D. J. MacDougall, Serial No. 209,157, filed February 2, 1951, the accuracy of the cell as well as the accuracy of the auxiliary apparatus can be supervised. The electrolyte concentration reading of the meter of the indicating apparatus should correspond to the value represented by the test element. If any other reading is indicated, either the conductivity cell or the auxiliary indicating apparatus is defective. Likewise, if the control apparatus is set to actuate the output relay thereof at an electrolyte concentration equal to that simulated by the test resistor, and the relay armature is not actuated, then the control apparatus or the conductivity cell is defective.

A check of the accuracy of the temperature-compensating conductivity cell for ambient temperature variations in the liquid under test may be made by subjecting the apparatus of Fig. 5 to equivalent temperature variations in air or any other electrically nonconducting fluid. A free flow of this fluid through apertures 25 will cause resistors 12 and 22 to follow the temperature variations of the fluid. If, during this operation, the conductivity cell-test element combination is connected to the aforementioned electrolyte concentration indicating apparatus, and the electrolyte concentration reading remains constant, the conductivity cell is operating properly. An appreciable variation in the electrolyte concentration reading is an indication that the temperature coefficient of impedance of resistor 12 has changed as compared to its initial value. Resistor 12 should, under these circumstances, be replaced to restore the conductivity cell to its initial accuracy.

While the above-described arrangements are illustrative of the principles of this invention, it should be obvious to persons skilled in the art to which this invention pertains that numerous modifications may be made without departing from the scope of the invention.

What is claimed is:

1. Apparatus for testing the accuracy of an automatic temperature-compensating conductivity cell having a temperature-compensating impedance element positioned within a container electrode and the combination thereof being enveloped by a removable outer electrode, comprising a metallic tubular shell having means for mechanical coupling to said conductivity cell so as to envelope said container electrode when said outer electrode is removed, said tubular shell having a plurality of apertures therein for the free flow of fluid therethrough, a metallic bottom plate fastened to said tubular shell, a solid resistor having substantially the same temperature-resistance characteristics as a volume of liquid between said outer electrode and said container electrode of specified liquid composition and electrolyte concentration, said resistor having a plurality of surfaces, one of said surfaces being fastened to said bottom plate, a U-shaped spring having two end portions, one of said end portions being fastened to a second surface of said resistor, and a contact fastened to the other of said end portions whereby mechanical coupling of the tubular shell to a conductivity cell compresses the U-shaped spring thereby causing the contact thereon to press firmly against said container electrode.

2. Apparatus for testing the accuracy of an automatic temperature-compensating conductivity cell having a temperature-compensating impedance element, a first electrode and a removable second electrode, comprising a tubular shell having means for coupling to said conductivity cell so as to envelope said first electrode when said second electrode is removed, a bottom plate fastened to said tubular shell, a solid resistor having substantially the same temperature-resistance characteristic as a volume of fluid between said electrodes of specified fluid composition and electrolyte concentration, said resistor having a plurality of surfaces, one of said surfaces contacting said bottom plate, a metallic spring having two end portions, one of said portions contacting a second of said resistor surfaces, and the other of said end portions projecting freely whereby the coupling of the tubular shell to a conductivity cell compresses the spring thereby causing the freely projecting end portion thereof to firmly contact said first electrode.

3. Apparatus for testing the accuracy of an automatic temperature-compensating conductivity cell having a temperature-compensating impedance element and a plurality of basic electrodes with individual electrical means connecting each of said basic electrodes, a first of said basic electrodes being a removable outer electrode enveloping a second of said basic electrodes, comprising a metallic container having means for mechanical coupling to said conductivity cell when said outer electrode is removed whereby said container is connected electrically to the electrical connecting means for the first of said basic electrodes, a solid impedance element positioned within said container having substantially the same temperature-impedance characteristic as a fluid volume between said plurality of basic electrodes of specified fluid composition and electrolyte concentration, a first terminal of said impedance element being electrically connected to said container, and an accommodating electrical conductor connected to a second terminal of said impedance element and electrically contacting said second basic electrode when said container is mechanically coupled to the electrical means connecting the first of said basic electrodes.

4. Apparatus for testing the accuracy of an automatic temperature compensating conductivity cell having a temperature-compensating impedance element and a plurality of basic electrodes with individual electrical means connecting each of said basic eelctrodes, a first of said basic electrodes being a removable outer electrode enveloping a second of said basic electrodes, comprising a metallic container having means for mechanical coupling to said conductivity cell when said outer electrode is removed whereby said container is connected electrically to the electrical connecting means for the first of said basic electrodes, a solid impedance element positioned within said container having substantially the same temperature-impedance characteristic as a fluid volume between said plurality of basic electrodes of specified fluid composition and electrolyte concentration, a first terminal of said impedance element being electrically connected to said container, and an electrical conductor connected to a second terminal of said impedance element and electrically contacting said second basic electrode when said container is mechanically coupled to the electrical means connecting the first of said basic electrodes.

5. Apparatus for testing the accuracy of an automatic temperature compensating conductivity cell having a temperature-compensating impedance element and a plurality of basic electrodes with individual electrical means connecting each of said basic electrodes, comprising a metallic container having means for mechanical coupling to said conductivity cell whereby said container is connected electrically to the electrical connecting means for the first of said basic electrodes, a solid impedance element positioned within said container having substantially the same temperature-impedance characteristic as a fluid volume between said plurality of basic electrodes of specified fluid composition and electrolyte concentration, a first terminal of said impedance element being electrically connected to said container, and an accommodating electrical conductor connected to a second terminal of said impedance element and electrically contacting said second basic electrode when said container is mechanically coupled to the electrical means connecting the first of said basic electrodes.

6. Apparatus for testing the accuracy of an automatic temperature-compensating conductivity cell having a temperature-compensating impedance element and a plurality of basic electrodes with individual electrical means connecting each of said basic electrodes, comprising a metallic container having means for mechanical coupling to said conductivity cell whereby said container is connected electrically to the electrical connecting means for the first of said basic electrodes, a solid impedance element positioned within said container having substantially the same temperature-impedance characteristic as a fluid volume between said plurality of basic electrodes of specified fluid composition and electrolyte concentration, a first terminal of said impedance element being electrically connected to said container, and an electrical conductor connected to a second terminal of said impedance element and electrically contacting said second basic electrode when said container is mechanically coupled to the electrical means connecting the first of said basic electrodes.

7. Apparatus for testing the accuracy of an automatic temperature compensating conductivity cell having a temperature-compensating impedance element and a plurality of basic electrodes with individual electrical means connecting each of said basic electrodes, comprising a metallic support having means for mechanical coupling to said conductivity cell whereby said support is connected electrically to the electrical connecting means for the first of said basic electrodes, a solid impedance element positioned upon said support having substantially the same temperature-impedance characteristic as a fluid volume between said plurality of basic electrodes of specified fluid composition and electrolyte concentration, a first terminal of said impedance element being electrically connected to said support, and an electrical conductor connected to a second terminal of said impedance element and electrically contacting said second basic electrode when said support is mechanically coupled to the electrical means connecting the first of said basic electrodes.

PHILLIP J. CADE.

REFERENCES CITED

The following references are of record in the file of this patent:

UNITED STATES PATENTS

| Number | Name | Date |
|---|---|---|
| Re. 23,282 | Thomson | Oct. 10, 1950 |
| 2,068,499 | Mackenzie | Jan. 19, 1937 |
| 2,180,580 | Clark | Nov. 21, 1939 |
| 2,484,585 | Quinn | Oct. 11, 1949 |
| 2,527,138 | Kohler | Oct. 24, 1950 |
| 2,560,209 | Borell et al. | July 10, 1951 |